United States Patent [19]

Hartman

[11] 4,168,958
[45] Sep. 25, 1979

[54] SMOKE STACK AIR WASHER

[76] Inventor: Eugene W. Hartman, 104 E. Wood St., Yale, Mich. 48097

[21] Appl. No.: 876,023

[22] Filed: Feb. 8, 1978

Related U.S. Application Data

[63] Continuation-in-part of Ser. No. 780,488, Mar. 23, 1977, abandoned.

[51] Int. Cl.² ............................................. B01D 47/00
[52] U.S. Cl. .......................................... 55/260; 55/90; 55/220; 261/115; 261/126; 110/119; 261/DIG. 9
[58] Field of Search .................. 55/DIG. 30, 220, 260, 55/240–242, 257 R, 90, 93, 94, 442–446; 261/118, 115, DIG. 9, 108, 111, 126; 110/119

[56] References Cited

U.S. PATENT DOCUMENTS

| | | | |
|---|---|---|---|
| 316,673 | 4/1885 | Stuart | 55/445 |
| 745,924 | 12/1903 | Stormer | 55/446 |
| 2,057,579 | 10/1936 | Kurth | 55/242 |
| 2,247,566 | 7/1941 | Walton | 55/257 QV |
| 2,342,058 | 2/1944 | Morris | 110/184 |
| 3,618,299 | 4/1969 | Vincent | 55/257 PV |
| 3,624,696 | 11/1971 | Cohen et al. | 261/118 |
| 3,729,901 | 5/1973 | Jackson | 55/DIG. 30 |
| 3,760,567 | 9/1973 | Stalker | 110/119 |
| 3,839,971 | 10/1974 | Snelling | 110/119 |
| 3,972,697 | 8/1976 | Short, Jr. | 55/242 |
| 4,081,255 | 3/1978 | Evans | 55/242 |

FOREIGN PATENT DOCUMENTS

| | | | |
|---|---|---|---|
| 508314 | 9/1930 | Fed. Rep. of Germany | 55/442 |
| 28565 | 12/1924 | France | 55/220 |
| 612765 | 11/1960 | Italy | 55/309 |
| 234754 | 2/1945 | Switzerland | 55/240 |

Primary Examiner—Bernard Nozick
Attorney, Agent, or Firm—Whittemore, Hulbert & Belknap

[57] ABSTRACT

A cleaner for the products of combustion in a smoke stack in the form of a vertically elongated chamber having a multiplicity of inclined baffles extending from opposite sides of the chamber to beyond the center line thereof and water spray devices located intermediate of each pair of vertically spaced baffles. In the preferred form, the baffles are inclined inwardly and upwardly, so that water from the nozzles flows to the outer edges of each baffle where it is connected to a drain.

15 Claims, 5 Drawing Figures

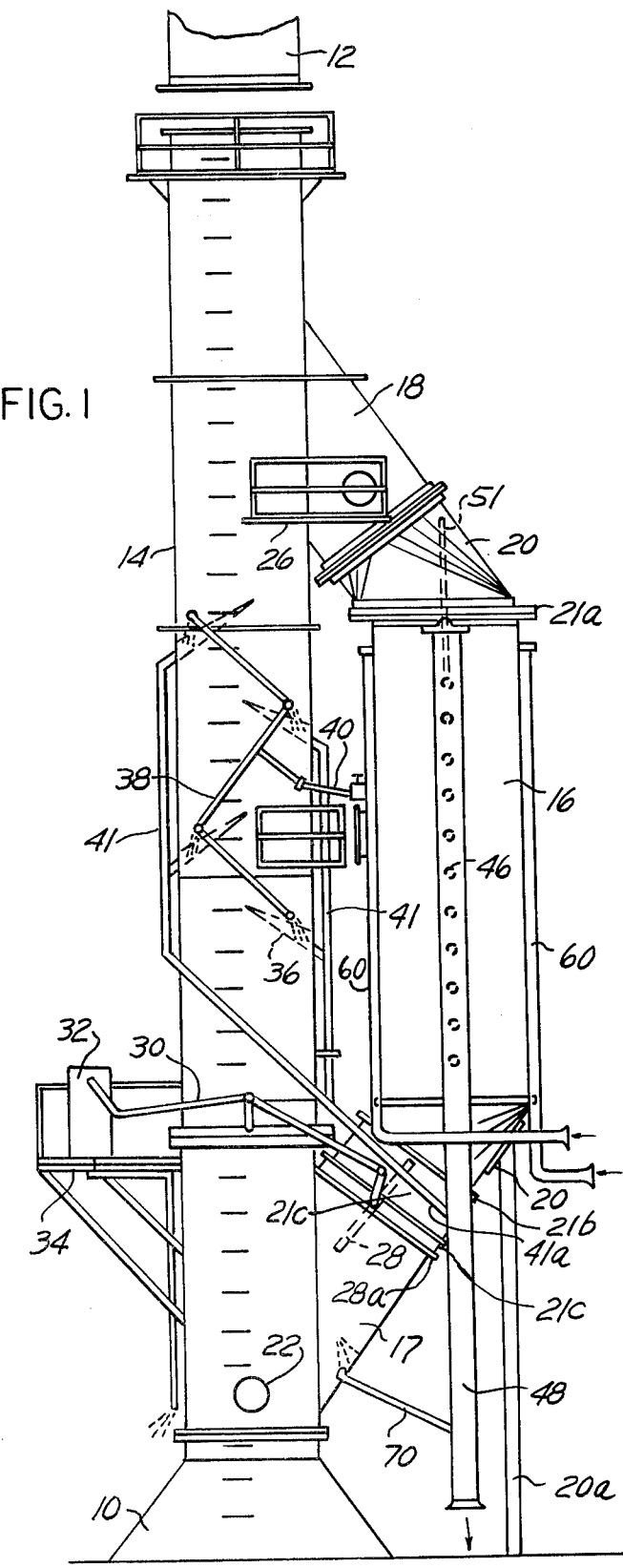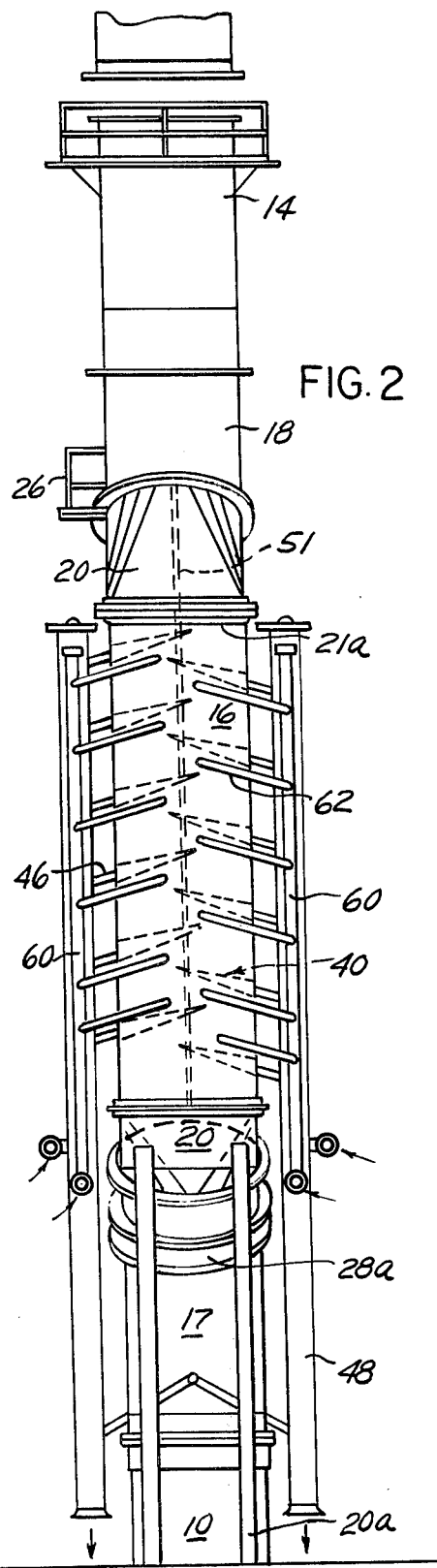

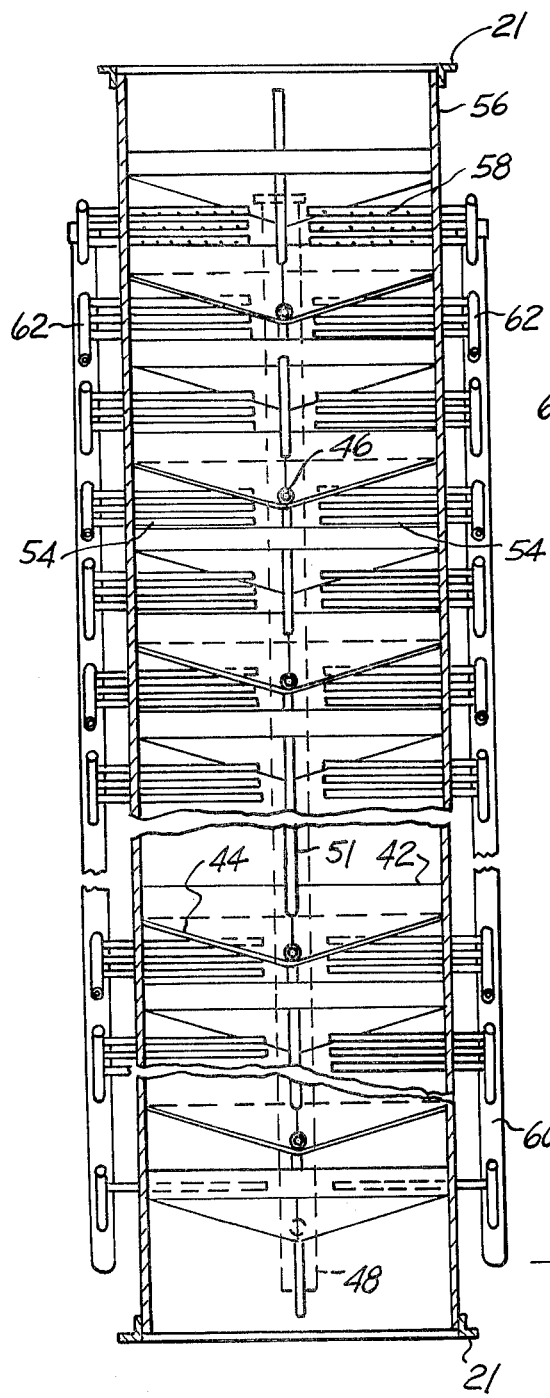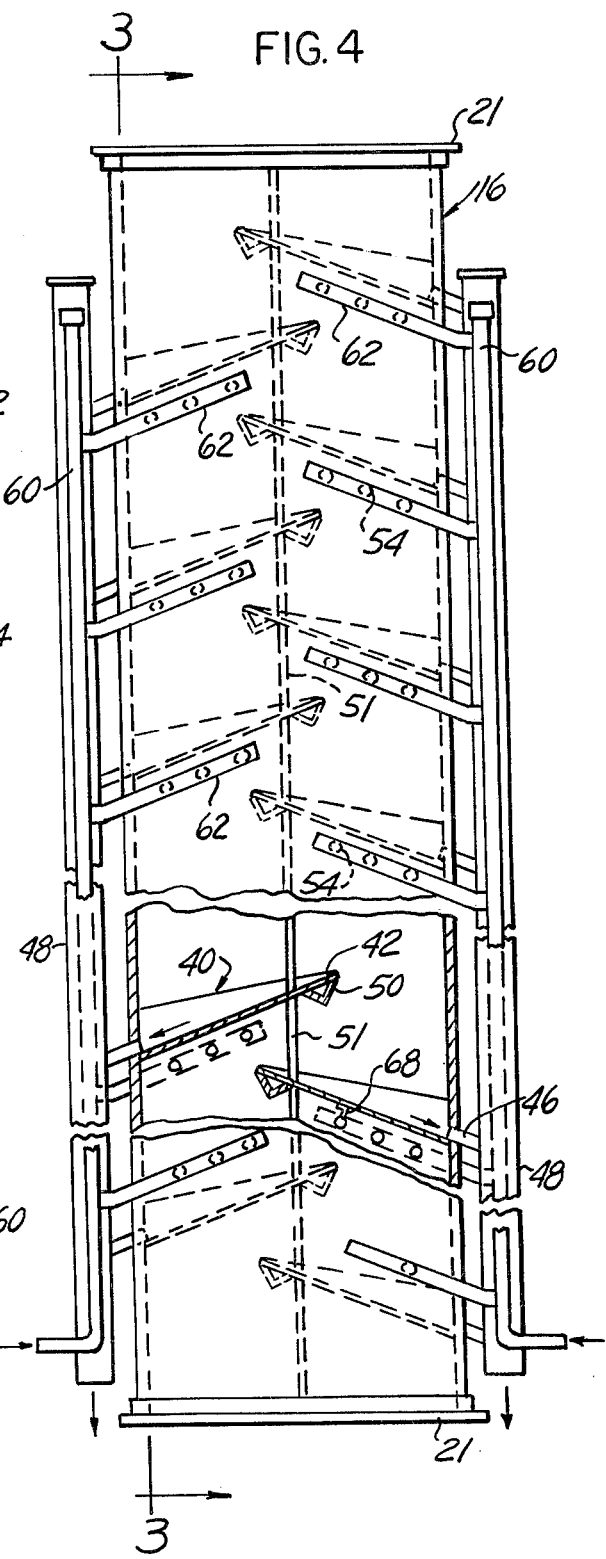

SMOKE STACK AIR WASHER

CROSS REFERENCE TO RELATED APPLICATION

The present application is a continuation-in-part of my prior co-pending application, Ser. No. 780,488 filed Mar. 23, 1977 now abandoned.

BACKGROUND AND SUMMARY OF THE INVENTION

At the present time many commercial smoke stacks, of the kind commonly used by utilities, have not been equipped with devices which efficiently remove air contaminants from the products of combustion. On the other hand such cleaners are available but only at relatively great expense.

The present invention is intended to provide in an economical manner structure which will efficiently remove large percentages of air contaminants from the products of combustion without requiring replacement or prolonged shutdown of existing facilities.

In general the present invention comprises air cleaning structure adapted to remove contaminants from products of combustion in the form of a vertically elongated chamber provided with baffles and water spray nozzles. In order to incorporate this structure in existing facilities, the upper portion of the existing stack is removed, leaving the lower portion standing. At this time the smoke cleaner chamber is erected, either in vertical alignment with the remaining lower portion of the stack, or as is preferred, in a position laterally of the stack. In the second case the chamber is provided at the side of a stack portion adapted to surmount the still standing lower portion of the stack. Thereafter the upper portion of the stack is replaced in position above the inserted smoke cleaner construction.

The smoke cleaner chamber is characterized by the provision of a multiplicity of inclined baffles extending in staggered relation from opposite sides of the chamber so that the inner edges of each baffle is located slightly beyond the vertical center line of the chamber. Intermediate of each pair of vertically spaced baffles there is provided a water spray device including a multiplicity of nozzles adapted to provide a relatively fine water spray substantially filling the space.

In the preferred form of the invention, the individual baffles are all inclined inwardly and upwardly so that the water collected on each baffle, together with the condensate and smoke contaminants collected by the spray, flow downwardly to the outer edge of the baffle at the side of the chamber. Drains are provided to collect the water, condensate and contaminants from each space and to conduct them to a drain pipe located outside of the chamber.

Conveniently the baffles are formed of metal and have a dished arrangement so that the liquid collecting on each baffle is carried to a central zone at the outer edge thereof. This is most conveniently provided by forming the baffle with a straight inner edge which may be suitably reinforced. The outer edge of the baffle is of V-shape so that a central trough of increasing depth is provided from the inner to the outer edge of the baffle.

BRIEF DESCRIPTION OF THE DRAWINGS

FIG. 1 is a fragmentary elevational view of the smoke cleaner construction applied to replace the lower portion of an existing smoke stack.

FIG. 2 is a side elevation of the construction shown in FIG. 1.

FIG. 3 is an enlarged vertical section view through the chamber.

FIG. 4 is an enlarged side view of the chamber with parts in sections.

COMPLETE DESCRIPTION

Figure 5:
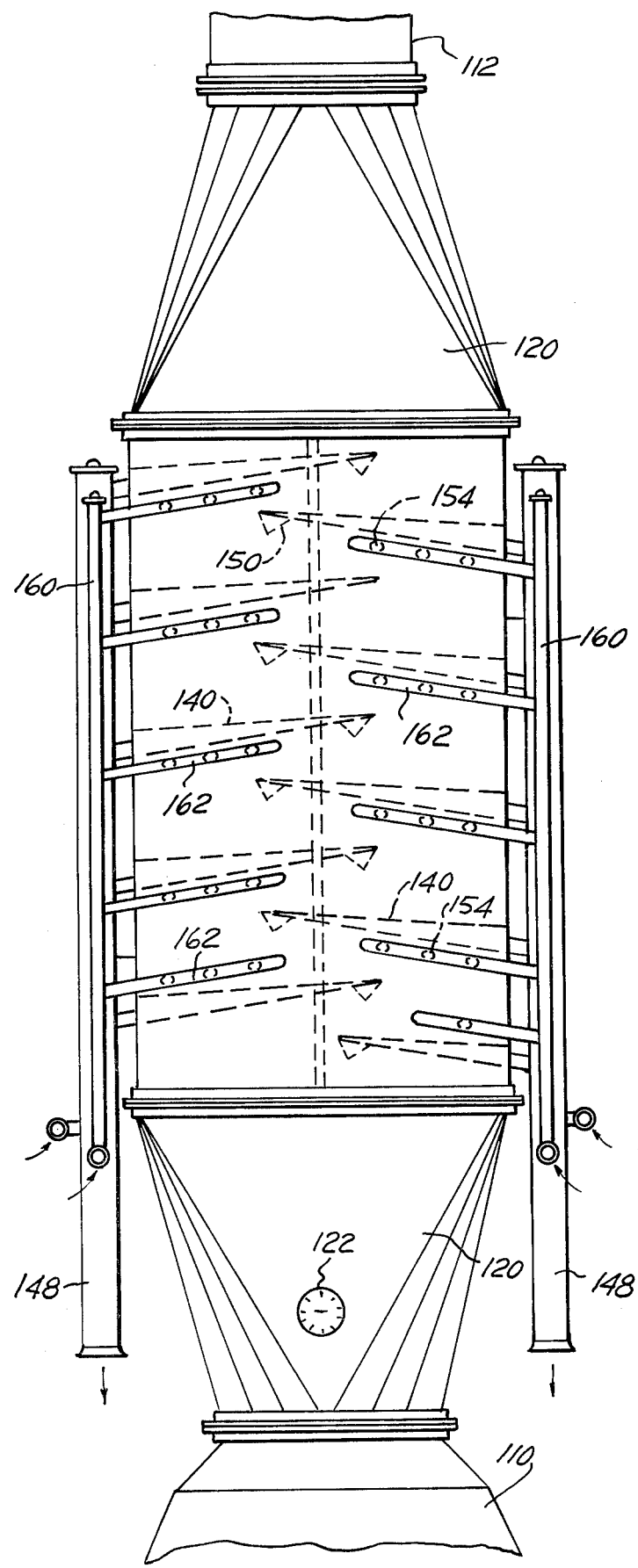
FIG. 5 is an elevational view of the arrangement in which the chamber is in vertical alignment with the original stack.

In FIG. 1 there is illustrated the foundation and lower portion 10 of an existing smoke stack, the upper portion thereof being indicated at 12 in operating position above the inserted structure which is the subject matter of the present invention.

It is contemplated that the condensing and air washing apparatus of the present invention shall be supplied to existing facilities and for this purpose the upper portion 12 of a previously existing smoke stack is removed from its foundation and lower portion and the subject matter of the present invention erected on the foundation and lower portion 10 of the smoke stack. Thereafter the upper portion 12 is replaced on top of the inserted structure.

By the foregoing construction great economies are effected since the existing smoke stack is used in its entirety and operation of the facility need not be long interrupted. The inserted structure may be previously constructed and may be inserted in position and connected in a short period of time.

In the preferred embodiment of the invention the insertion comprises a stack portion 14 which is normally of the same diameter as the lower portion of the smoke stack 12. In addition it comprises a cleaner chamber indicated generally at 16 which is connected in parallel to the stack portion 14 by large conduits 17 and 18. Preferably the cleaner chamber portion 16, as will subsequently be described, is of rectangular cross section and the conduits 17 and 18 are circular cross section so that transition structure such as indicated at 20 is provided to interconnect the square and circular cross sectional shapes. Support columns 20a are provided which at the top are connected to doubler pads 20b, welded to the bottom of lower transition member 20.

Referring now particularly to FIG. 4, the chamber 16 is provided at top and bottom with rectangular frames 21 which may be of angle irons providing for quick assembly and disassembly with expansion joint 21a and 21b, the latter connecting to a spool 21c which is of circular cross-section for cooperation with a damper, later to be described.

A manhole is provided at 22 and an additional manhole is provided at 24 accessable from a platform 26.

Dampers are provided in the stack portion 14 and in the conduit 17, the damper in the conduit being shown at 28, mounted in damper frame 28a. The dampers are interconnected by suitable linkage indicated generally at 30 connected to a damper controller 32 mounted on a support platform 34. Controller 32 is connected to the dampers so that as the damper in the conduit 17 moves to open position, the damper in the stack portion 14 moves to closed position. This of course provides for controlling the flow of smoke either through the cleaner chamber 16 or the stack portion 14. The stack portion 14 will be provided with baffle and water spray devices. The stack section 14 is provided with baffles such as shown at 36 and internal spray nozzles connected to external water spray lines as indicated at 38 to which water may be led from a flexible hose 40 connected to a water spray line 60 intended primarily for supply of water under pressure to the cleaner chamber 16. Drain lines 41 are connected to the stack section 14, and connected to drain pipes 48 (later to be described) as shown at 41a.

The details of construction of the cleaner chamber are best illustrated in FIGS. 2, 3 and 4. As previously stated the chamber 16 is preferably of square or rectangular cross section and is provided with a multiplicity of baffles 40 which extend inwardly and upwardly from opposite sides of the chamber 16 as best illustrated in the sectional portion shown in FIG. 4. The inner edges 42 of the baffles are straight as best seen in FIG. 3 whereas the outer edges 44 are of generally V-shape. As a result each baffle is dished so as to cause water, condensate and contaminants collected by the water to flow to the sidewall of the chamber to which the baffles are connected. At this point, that is at the lowermost point of the baffle, a pipe 46 is connected which communicates to an external vertical drain pipe 48.

Inasmuch as the chamber 16 is of relatively large size as for example six to eight feet across, it is desirable to provide reinforcement means for the inner free edge of each baffle. Conveniently this takes the form of an angle iron 50 welded to the underside of the straight inner edge of each baffle. The ends of the angle iron are preferably suitably connected to the remaining sidewalls of the chamber 16. As a result of this construction the angle irons 50 not only support and reinforce the free inner edges 42 of the baffles but also provide deflectors for the products of combustion as they flow around the inner edges of the baffles and cause them to flow more completely into the space where they flow through the water spray provided in the spaces.

To further reinforce the baffle and to eliminate vibration which might otherwise occur as a result of turbulence resulting from forced draft, reinforcing bars 51, conveniently round rods or pipes, are welded or otherwise connected centrally between lateral edges of the baffles. These may be connected at top and bottom to vertically aligned portions of transition member 20.

The water spray referred to is provided by a multiplicity of nozzle tubes 54 which extend through sidewalls 56 of the chamber 16 as best illustrated in FIG. 3. Each of the nozzle pipes 54 is closed at its inner end and is provided with a multiplicity of openings operating as separate nozzles to project a fine spray of water into the space between each pair of vertically spaced baffles. The spray pipes 54 adjacent the top of FIG. 3 are illustrated as including the ports or nozzles 58 and it will be understood that such openings are provided in all of the nozzle or spray pipes 54. The openings 58 may be circular or elongated as required to produce a desirable spray distribution.

Exterior of the chamber 16 at opposite sides are provided high pressure water supply lines 60 to which the nozzle pipes 58 are connected by inclined water supply header lines 62 each of which as illustrated carry a few of the spray or nozzle pipes 54.

With the structure as described in the foregoing it will be apparent that the smoke and other products of combustion is required to flow in a zigzag path upwardly through the chamber 16 around the inner overlapped edges of the baffles 40. The reinforced and deflection members of 50 distribute the smoke and products of combustion generally throughout the open sided chambers provided between each vertically spaced pair of baffles. These chambers are substantially completely filled with a constantly flowing water spray through which the smoke is required to pass. This removes substantially all of the solid contaminates such as fly ash and also removes substantial amounts of gaseous contaminants such for example as sulphur compounds and the like. Each zone between vertically spaced pairs of baffles is independently vented through the pipe 46 to the drain 48 through which the collected water and contaminants may flow through a sump from which it may be drawn by a suitable high pressure pump (not shown) for resupply to the high pressure water feed lines 60.

It is to be understood that the present invention is intended primarily for retrofitting to existing systems. In operation it will remove very large porportions of contaminants in a much less expensive operation than some of the highly sophisticated and enormously expensive systems which have been devised. Not all existing facilities justify or can afford the expense of these highly sophisticated systems, and the present invention offers such installations a relatively inexpensive but still highly efficient operation for removal of contaminants.

It will of course be understood that the construction illustrated herein is of relatively large size. For example, the chamber 16 may be approximately 40 feet in height and have a cross section dimension of six to eight feet. The spray nozzles or nozzle pipes 54 are thus of substantial length and in some cases it is desirable to connect the outer ends thereof to the underside of the adjacent baffle by suitable means such for example as an angle bracket as illustrated at 68. The high pressure pipes or headers 60 may for example be six inch pipes and the supply pipes 62 may be three inch pipes.

It will be understood that the water, condensate and other material collected on the individual baffles is led to a sump, as previously described, where the solid material is permitted to settle and the water reused.

In FIG. 1 there is illustrated a drain pipe 70 which connects the conduit 17 to the drain pipe 48.

The side edges of the baffles 40 may conveniently be inclined to extend inwardly and upwardly at an angle of about 10° whereas the central trough portion thereof may be inclined from the horizontal at an angle of approximately 20°.

The baffles 40 extend approximately 1–1½ feet beyond the vertical center line of the chamber 16. The innermost nozzle tubes 54 are located approximately six inches from the center line toward the side of the chamber from which they extend. Adjacent the vertical centerline baffles are spaced approximately six feet apart and desirably the free inner edge of each baffle is located 2–2½ feet from the adjacent pair of baffles extending from the opposite side of the chamber.

In FIG. 5, there is illustrated the arrangement in which the cleaner chamber 116 is erected in vertical alignment with the original stack, the upper portion of which is shown in this figure at 112, and the support and lower portion at 110. Transition members 120 are provided, similar to member 20, but shaped to accommodate the in-line arrangement. Baffles 140, drain pipe 148, reinforcement 150, nozzle pipes 154, high pressure water supply line 160, and inclined header lines 162 are illustrated, and may be as described in connection with FIGS. 1-4.

From the foregoing it will be observed that each vertically adjacent pair of baffles 40 define therebetween a sub-chamber which is partly closed by the outer end of the baffle projected from the opposite wall of the chamber into the space between the vertically adjacent baffles. It will further be apparent, as best seen in FIG. 4, that the baffle which extends a short distance into the sub-chamber defines with the upper and lower baffles of the sub-chamber restricting inlet and outlet ports through which pass all of the products of combustion. Each of the sub-chambers as defined herein receives a water spray device effective substantially to fill the sub-chamber with a finely divided spray of water. The products of combustion in general are partially deflected by the reinforcing and deflection member 50 so as to insure that the products of combustion are contacted to the maximum degree by the water spray.

It will moreover be seen that each of the sub-chambers acts independently of the others and that all of the contaminants and condensates collected by the water spray therein flow to the individual outlet pipe connected to such sub-chamber.

It will further be apparent that the particular shape of the baffle, having a straight inner edge and a V-shaped outer edge, is particularly well adapted to insure efficient collection and disposal of the contaminants collected therein. The flow of water over the upper surface of each baffle is initiated at its inner edge uniformly across its width. However, since the baffle in effect provides a flow channel of continuously increasing depth and increasing angularity of the sidewalls defining the "V," the increasing flow of water along the "V" carries the solid particles collected therein most efficiently to an outlet pipe.

What is claimed is:

1. A smoke stack condenser, air washer and filter system for connection to the combustion chamber of large utility type installations comprising a vertically elongated main chamber of rectangular cross-section in communication with the usual stack through which all products of combustion, except those removed by the said system, are required to pass upwardly by the draft of combustion, a multiplicity of inwardly and upwardly inclined baffles provided at opposite sides of the chamber with the inner edge portions of said baffles extending beyond the midplane of said chamber in overlapped relation, said baffles being inclined toward the direction of flow to provide minimum resistance to the large volume flow of products of combustion characteristic of the type of combustion chamber defined, the baffles at opposite sides of said chamber being staggered so that the inner edge of each intermediate baffle extends a short distance into the space between two vertically adjacent baffles at the opposite side of the chamber whereby each pair of vertically adjacent baffles defines a sub-chamber which is partly closed by the inner edge of a baffle extending into the space from the opposite chamber wall and which defines with the said pair of vertically adjacent panels a restricted inlet and outlet for flue gases, water spray devices located in each sub-chamber between each adjacent pair of vertically spaced baffles, said spray devices comprising a plurality of nozzle pipes each having a multiplicity of ports effective to substantially fill the sub-chamber with a water spray, and drains provided at the lower outer edge of each baffle to carry off all water from the spray devices located in the sub-chamber defined between each pair of vertically spaced baffles, as well as the condensate and contaminants of the products of combustion collected therein, to the exterior of said main chamber.

2. A system as defined in claim 1, in which said drains comprise pipes which extend through the outer walls of each sub-chamber, and connect to outlet headers located outside said main chamber leading to a settling pool from which water is recirculated.

3. A system as defined in claim 1, in which the inner edges of said baffles are spaced to provide substantially equal area smoke passages above and below said edges.

4. A system as defined in claim 1, in which the chamber has a vertical height of approximately forty feet, a transverse width of approximately six to eight feet, and adjacent vertically spaced pair of baffles are spaced apart approximately six feet.

5. A system as defined in claim 1 in which said system comprises a vertical stack section of circular cross-section, said vertically elongated cleaner chamber being at one side of said stack section, inclined conduits connected to said stack section above and below said chamber and in communication respectively with the top and bottom ends of said chamber, said chamber and conduits being of rectangular cross-section, and tubular transition members connected between said conduits and the ends of said chamber, said transition members being of circular cross-section at the ends thereof connected to said conduits and of rectangular cross-section at the ends thereof connected to said chamber.

6. A system as defined in claim 1, in which said baffles are generally rectangular but have straight inner edges and V-shaped outer edges to collect waste water centrally of the lower outer edges thereof, and said drains comprise pipes extending outwardly through the sides of the chamber, and outlet headers at the outside of said chamber to which said drain pipes connect.

7. A system as defined in claim 6, in which the inner overlapped edges of said baffles are provided with reinforcing and smoke deflecting bars connected thereto.

8. A system as defined in claim 7, in which said bars are angle irons secured to the underside of straight inner edges of said baffles.

9. A system as defined in claim 7, in which the edges of said baffles inclined downwardly and outwardly at about 10°, and the central portion between said edges inclines downwardly and outwardly at about 20°.

10. A smoke stack condenser and cleaner for connection to the combustion chamber of large utility type installations comprising a vertically elongated chamber through which all products of combustion of the combustion chamber pass upwardly, said chamber being of generally rectangular cross-section and having baffles extending inwardly and upwardly from opposite side walls, said chamber having a width between the side walls carrying the baffles of approximately six to eight feet, the inner edges of said baffles overlapping and extending beyond the vertical central plane of the chamber approximately one to one and a half feet, said baffles having their inner edges straight and their outer edges formed in a V-shaped cross-section, a plurality of spray or nozzle pipes between each vertically spaced pair of baffles, said pipes having a multiplicity of orifices, means for supplying water at high pressure to said pipes whereby the space between each vertically spaced pair of baffles is substantially completely filled with a constantly flowing water spray, drain pipes connected through the side walls of said chamber to the bottoms of the Vees at the outer edges of said baffles.

11. Structure as defined in claim 10, which comprises reinforcing and flow directing bars secured to the underside of said baffles at the inner edges thereof.

12. Structure as defined in claim 10, in which high pressure water supply lines are provided to extend vertically at the outer sides of opposite side walls of said chamber, water supply headers connected to said high pressure water supply lines and inclined to be positioned exterior of the chamber and parallel to said baffles with each inclined water supply header located just below the level of a baffle at the interior of the chamber, a plurality of nozzle pipes extending through a side wall of the chamber from each water supply header to be parallel to and closely adjacent the under side of a baffle.

13. Structure as defined in claim 12, and connections between the outer ends of said nozzle pipes and the baffle thereabove.

14. A smoke stack condenser, air washer and cleaning system for removing contaminants and solid particles from products of combustion produced by operation of large commercial furnaces which comprises a vertically elongated main cleaning chamber of rectangular cross-section having an open lower end to receive a large volume upward flow of hot products of combustion as they are produced by operation of the furnace and an open upper end to discharge the cleaned products of combustion upwardly directly into the lower end of a smoke stack, a plurality of baffles of generally rectangular shape having outer edges fixed to a first pair of opposed side walls of said main cleaning chamber, said baffles extending transversely between the other pair of opposed side walls, and extending from the first pair of side walls upwardly and inwardly a short distance beyond the median vertical plane of the cleaning chamber, said baffles being spaced vertically on each of said first pair of chamber side walls, and staggered such that the inner edges of the intermediate baffles extends a short distance into the space between an adjacent pair of vertically spaced baffles extending upwardly and inwardly from the opposite side of said cleaning chamber, each adjacent pair of vertically spaced baffles together with the inner edge portion of a baffle extending a short distance into the space therebetween defining a sub-chamber closed at its top, bottom, outer side and lateral sides, and having an inlet opening extending across the full width of said main chamber between the inner edge portion of the lower one of said pair of vertically spaced baffles and the inner edge portion of the baffle extending into the space between said adjacent pair of vertically spaced baffles from the opposite side of said main chamber and an outlet opening extending across the full width of said main chamber between the inner edge portion of the upper one of said pair of vertically spaced baffles and the inner edge portion of the baffle extending into the space between said adjacent pair of vertically spaced baffles from the opposite side of said main chamber, the outlet port from each of said sub-chambers constituting the inlet port to the next adjacent and higher sub-chamber at the opposite side of said main chamber, said baffles being positioned to define substantially equal inlet and outlet ports for each sub-chamber, vertical high pressure water feed lines at the exterior of said main chamber, a water supply header located at the outside of each of said sub-chambers in a position closely spaced below the plane of the baffle forming the top wall of each sub-chamber and connected to said high pressure supply lines, a plurality of spray pipes connected to each of said headers and extending across its associated sub-chamber, each spray pipe having a multiplicity of spray ports therein operable to substantially fill said sub-chamber with a water spray, each of said baffles being shaped at its outer edge to an upwardly concave configuration to cause all water and contaminants carried thereby to flow to and collect at the central portion of the outer edge of said baffle, and a discharge pipe connected through the side of said main chamber to the collection zone of liquid at the central portion of the outer edge of said baffle.

15. A system as defined in claim 14 in which said baffles are of generally rectangular configuration but include straight inner and upper edges extending completely across the main chamber, the lower outer edges of the baffles being of upwardly open V-shape to provide a discharge flow of increasing volume across all portions of the baffle to the outlet to the discharge pipe.

* * * * *